United States Patent
Shimura et al.

(10) Patent No.: US 9,941,713 B2
(45) Date of Patent: Apr. 10, 2018

(54) ELECTRONIC APPARATUS

(71) Applicant: FUJITSU LIMITED, Kawasaki-shi, Kanagawa (JP)

(72) Inventors: Tatsuya Shimura, Kawasaki (JP); Masashi Hattori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/444,015

(22) Filed: Feb. 27, 2017

(65) Prior Publication Data

US 2017/0170670 A1     Jun. 15, 2017

Related U.S. Application Data

(63) Continuation of application No. PCT/JP2014/072831, filed on Aug. 29, 2014.

(51) Int. Cl.
| | |
|---|---|
| *H02J 7/00* | (2006.01) |
| *G06F 1/16* | (2006.01) |
| *H04B 1/3877* | (2015.01) |
| *H04B 1/3883* | (2015.01) |
| *H04L 12/26* | (2006.01) |

(52) U.S. Cl.
CPC .......... *H02J 7/0021* (2013.01); *G06F 1/1632* (2013.01); *H02J 7/0044* (2013.01); *H04B 1/3877* (2013.01); *H04B 1/3883* (2013.01); *H04L 43/0811* (2013.01)

(58) Field of Classification Search
CPC .............................. G06F 1/1632; H02J 7/0044
See application file for complete search history.

(56) References Cited

U.S. PATENT DOCUMENTS

| | | | |
|---|---|---|---|
| 2002/0132639 A1 | 9/2002 | Sato | |
| 2013/0086397 A1 | 4/2013 | Uchida | |
| 2015/0048752 A1* | 2/2015 | Van Den Brink | H02J 5/005 315/246 |

FOREIGN PATENT DOCUMENTS

| | | | | |
|---|---|---|---|---|
| JP | 1993-161263 | * | 6/1993 | ............... H02J 1/00 |
| JP | 2000-112591 | | 4/2000 | |
| JP | 2001-222689 | * | 8/2001 | ............. G06K 17/00 |
| JP | 2002-281127 | | 9/2002 | |
| JP | 2013-080523 | | 5/2013 | |

OTHER PUBLICATIONS

International Search Report of PCT/JP2014/072831 dated Nov. 4, 2014.
Written Opinion of the International Searching Authority (Form PCT/ISA/237) of PCT/JP2014/072831 dated Nov. 4, 2014 Partial translation.

* cited by examiner

*Primary Examiner* — Tuan H Nguyen
(74) *Attorney, Agent, or Firm* — Maschoff Brennan

(57) ABSTRACT

An electronic apparatus is to be electrically connected to another electronic apparatus. The electronic apparatus comprises a first contact, a memory and a processor. The first contact is a contact whose conductivity varies corresponding to a connection state with another electronic apparatus. The processor is coupled to the memory. The processor is configured to perform acquiring a value indicating the conductivity of the first contact when bringing the first contact into a contact state with another electronic apparatus and determining, based on the acquired value indicating the conductivity and a predetermined reference value, whether a connection between the electronic apparatus and another electronic apparatus is sufficient.

7 Claims, 18 Drawing Sheets

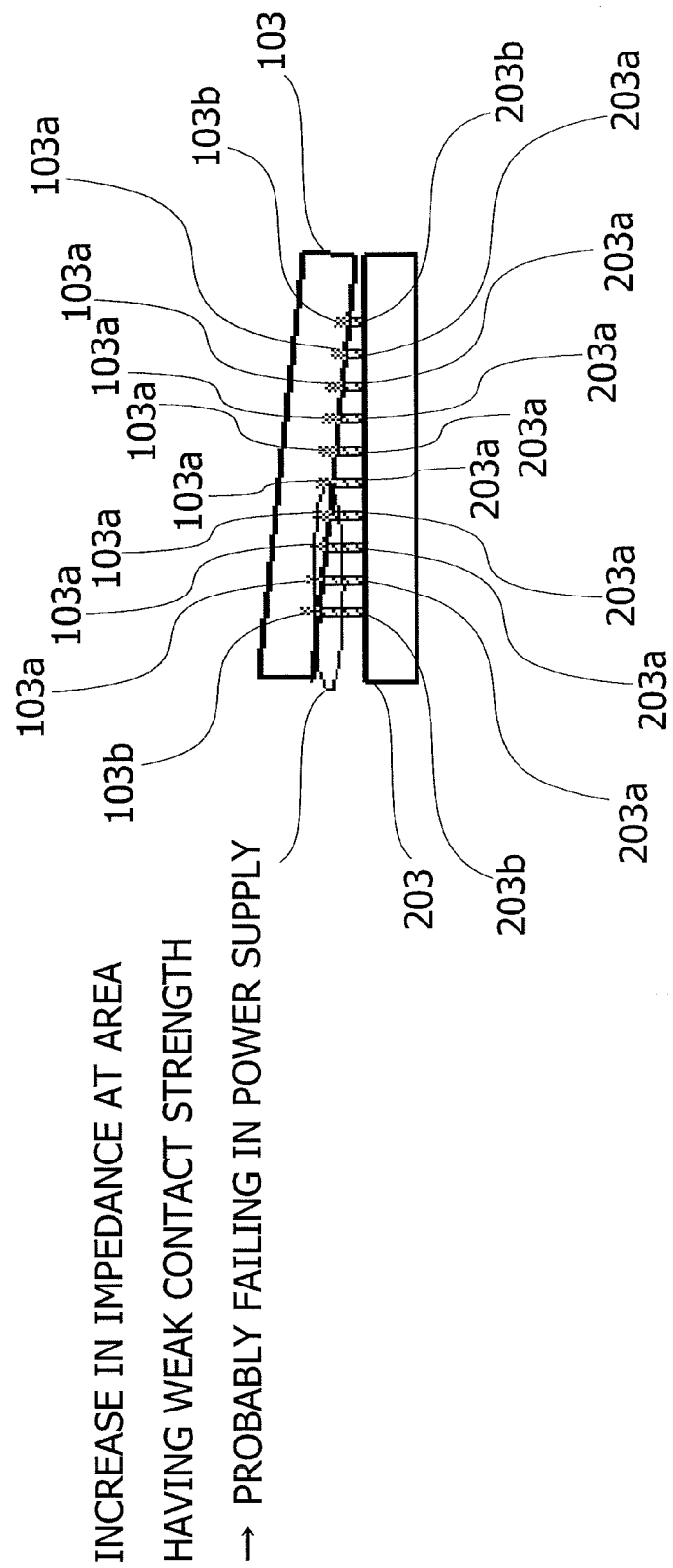

FIG. 10B

| | DOCK_DET#1 / DOCK_DET#2 | | |
|---|---|---|---|
| | Min(-5%) | Typ. | Max(+5%) |
| NOT YET CONNECTED | 1.37V | 1.44375V | 1.52V |
| DOCK CONNECTED CRADLE'S MICROCONTROLLER OFF | 0.81V | 0.8555V | 0.90V |
| DOCK CONNECTED CRADLE'S MICROCONTROLLER ON | 1.15V | 1.216V | 1.28V |

FIG. 10C

| | DOCK_DET#3 / DOCK_DET#4 | | |
|---|---|---|---|
| | Min(-5%) | Typ. | Max(+5%) |
| NOT YET CONNECTED | 0.99V | 1.05V | 1.11V |
| DOCK CONNECTED BODY MICROCONTROLLER OFF | 0.81V | 0.8555V | 0.90V |
| DOCK CONNECTED BODY MICROCONTROLLER ON | 1.15V | 1.216V | 1.28V |

ELECTRONIC APPARATUS

CROSS-REFERENCE TO RELATED APPLICATION

This application is a continuation application of International Application PCT/JP2014/072831 filed on Aug. 29, 2014 and designated the U.S., the entire contents of which are incorporated herein by reference.

FIELD

The embodiments discussed herein are related to an electronic apparatus and an electronic component.

BACKGROUND

An electronic apparatus (a mobile terminal which will hereinafter be termed a smartphone and other equivalent mobile apparatuses) having portability, instanced by a tablet Personal Computer (PC) or a smartphone that has been widely used, is connected to an accessory apparatus like a cradle or a docking station in many cases. The smartphone and the accessory apparatus are electrically connected by bringing contacts of connectors provided respectively thereon into a contact state. Such being the case, there is proposed a method of checking whether the smartphone and the accessory apparatus are connected or not yet connected (e.g., Patent Document 1).

DOCUMENTS OF PRIOR ART

Patent Document

[Patent Document 1] Japanese Laid-open Patent Publication No. 2013-080523

SUMMARY

According to an aspect of the embodiments, an electronic apparatus is to be electrically connected to another electronic apparatus. The electronic apparatus comprises a first contact, a memory and a processor. The first contact is a contact whose conductivity varies corresponding to a connection state with another electronic apparatus. The processor is coupled to the memory. The processor is configured to perform acquiring a value indicating the conductivity of the first contact when bringing the first contact into a contact state with another electronic apparatus and determining, based on the acquired value indicating the conductivity and a predetermined reference value, whether a connection between the electronic apparatus and another electronic apparatus is sufficient.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 9B is an enlarge drawing illustrating another example of the connecting portion between the smartphone and the cradle;

FIG. 10B is a diagram illustrating one example of a range of voltage values from which to determine a normal connection;

FIG. 10C is a diagram illustrating another example of the range of the voltage values from which to determine the normal connection;

DESCRIPTION OF EMBODIMENTS

An embodiment of an electronic apparatus will hereinafter be described with reference to the drawings. A configuration of the following embodiment is an exemplification, and the electronic apparatus is not limited to the configuration of the embodiment.

<Embodiment>

Even when the smartphone and the accessory apparatus are electrically connected, contacts of the smartphone and contacts of the accessory apparatus are in an insufficient contact state as the case may be. The contact state between the contacts is insufficient, in which case electric power probably fails in being supplied and received between the smartphone and the accessory apparatus.

Under such circumstances, one aspect of the embodiment aims at providing the electronic apparatus capable of detecting an insufficient connection to another electronic apparatus.

The embodiment will describe such an instance that a smartphone is applied by way of one example of the "electronic apparatus", and a cradle is applied by way of one example of "another electronic apparatus". The "electronic apparatus" is not, however, limited to the smartphone but may include a mobile terminal instanced by a tablet Personal Computer (PC) and a feature phone. "Another electronic apparatus" is not limited to the cradle but may include an accessory apparatus instanced by a docking station. However, such a case may also be available that the mobile terminal described above corresponds to one example of "another electronic apparatus", while the accessory apparatus corresponds to one example of the "electronic apparatus".

The smartphone and the cradle can detect an electrically connecting state between both these apparatuses. The smartphone and the cradle according to the embodiment are electrically interconnected by bringing mutual electric contacts into a contact state with each other. The smartphone and the cradle determine the electrically connecting state between the smartphone and the cradle, based on a voltage value of a voltage applied to their contacts upon the connection between both the apparatuses. The smartphone is placed on the cradle in the case of being charged with electricity or performing communications with external apparatuses and in other equivalent cases.

Figure 1A:
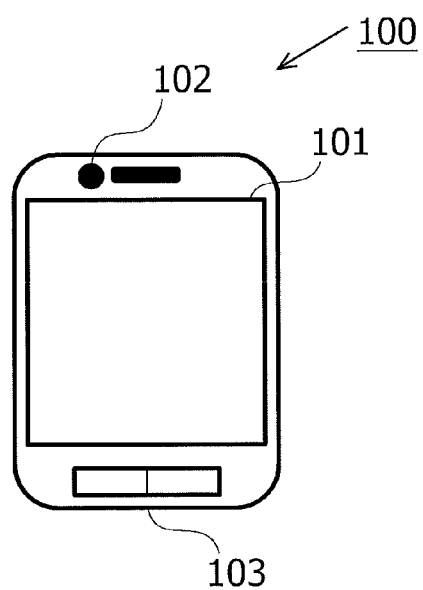
FIGS. 1A-1B are drawings illustrating one example of a configuration of an external appearance of a smartphone.
Figure 1B:
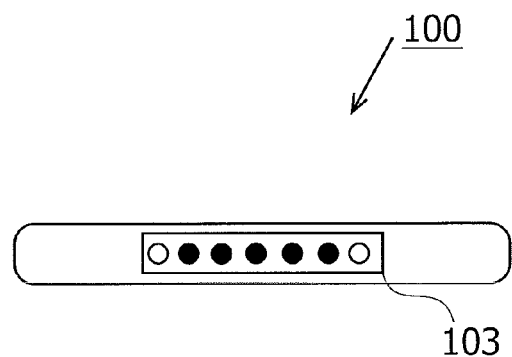

FIGS. 1A-1B are drawings illustrating one example of a configuration of an external appearance of a smartphone 100. FIG. 1A is a front view of the smartphone 100. FIG. 1B is a planar view of a lower surface of the smartphone 100. The smartphone 100 has, e.g., a waterproof function. The smartphone 100 is equipped with a Liquid Crystal Display (LCD)/touch panel 101, an in-camera 102 and a connector (female connector) 103. The LCD/touch panel 101, which serves as a display, displays various items of information. The LCD/touch panel 101 serving as an input device accepts a touch operation of a finger and other equivalent regions of a user. The in-camera 102 is instanced by an optical camera. The connector 103 is provided at a lower portion of the smartphone 100 and used for the connection with a cradle 200. An in-depth description of the connector 103 will be made later on.

Figure 2:
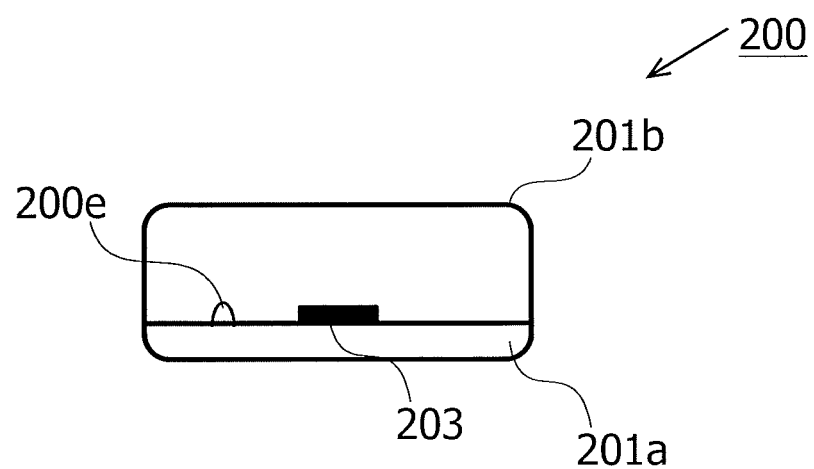
FIG. 2 is a drawing illustrating one example of a configuration of an external appearance of a cradle.

FIG. 2 is a drawing illustrating one example of a configuration of an external appearance of the cradle 200. The smartphone 100 is placed on the cradle 200. The cradle 200 provides a means for charging the smartphone 100 placed thereon with the electricity or a data communication means with the external apparatus instanced by a Personal Computer (PC). The cradle 200 is equipped with a body 201, a mechanical switch 200e, and a connector (male connector) 203. The body 201 includes a base 201a, and a rear plate 201b that supports the smartphone 100 placed on the base. The mechanical switch 200e is provided in a state of protruding from the base 201a, and is pressed by the smartphone 100 to be placed, thereby detecting the placement of the smartphone 100 on the cradle 200. The connector 203 is electrically connected to the connector 103 of the smartphone 100.

Figure 3:
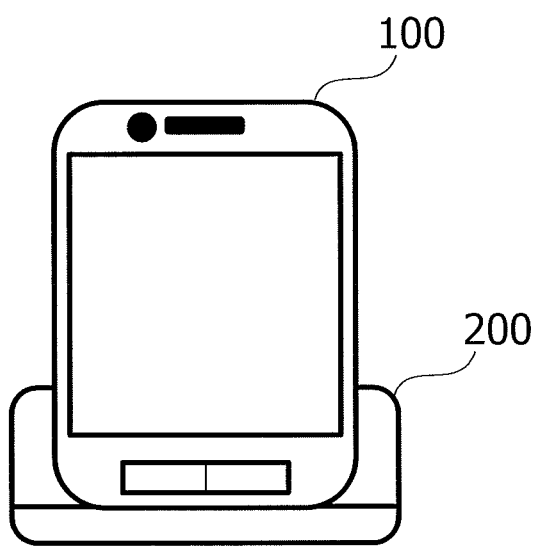
FIG. 3 is a drawing illustrating one example of a state in which the smartphone is placed on the cradle.

FIG. 3 is a drawing illustrating one example of a state in which the smartphone 100 is placed on the cradle 200. As illustrated in FIG. 3, the smartphone 100 is placed on the base 201a of the cradle 200, whereby the connector 103 of the smartphone 100 is connected to the connector 203 of the cradle 200. The smartphone 100 is placed on the cradle 200 and is thereby enabled to make use of a variety of external apparatuses connected to the cradle 200. The smartphone 100 is charged with the electricity from an Alternating Current (AC) source connected to the cradle 200.

Figure 4:
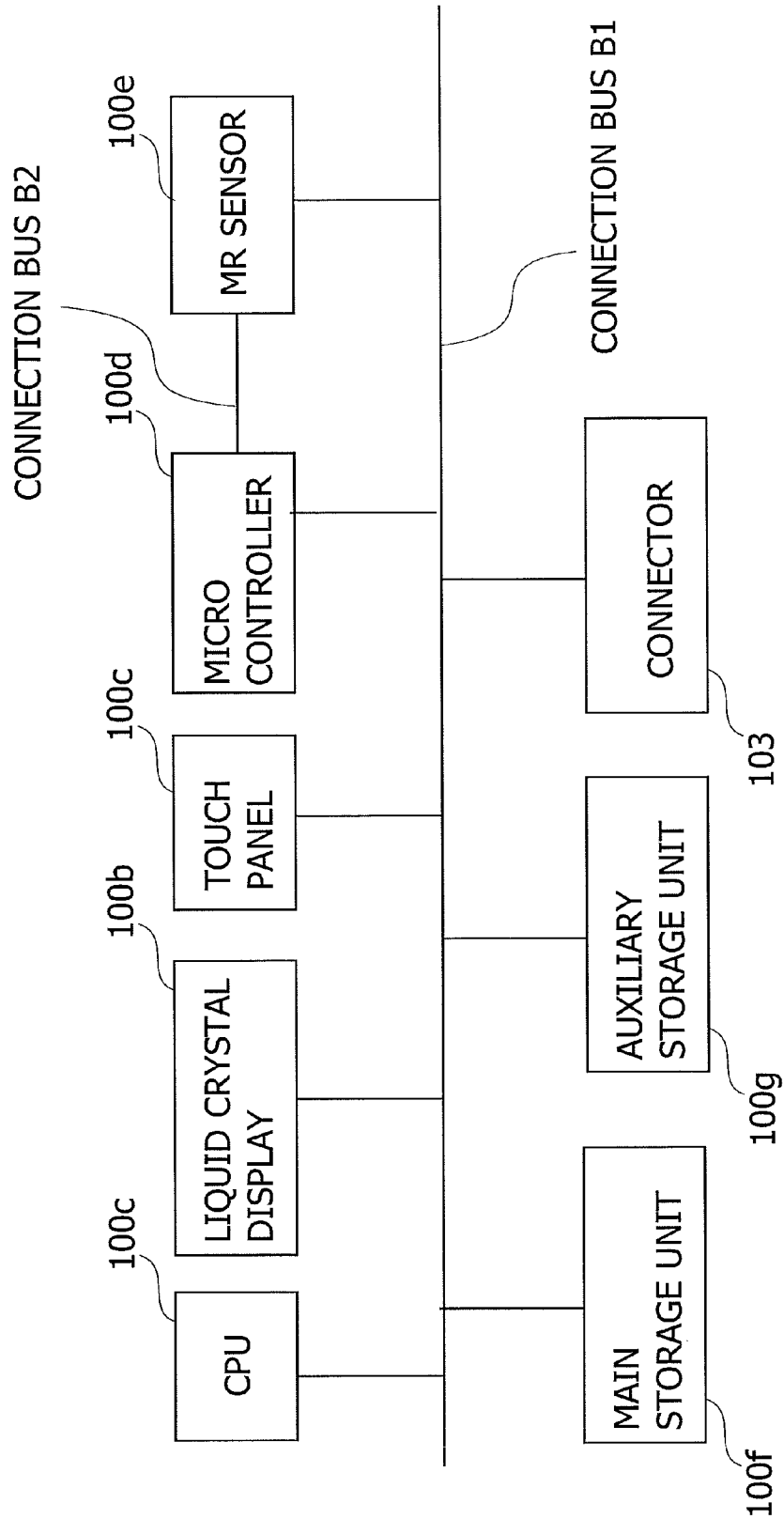
FIG. 4 is a diagram illustrating one example of a hardware configuration of the smartphone.

FIG. 4 is a diagram illustrating one example of a hardware configuration of the smartphone 100. The smartphone 100 includes a Central Processing Unit (CPU) 100a, a Liquid Crystal Display (LCD) 100b, a touch panel 100c, a microcontroller 100d, a Magneto Resistive (MR) sensor 100e, a main storage unit 100f, an auxiliary storage unit 100g, and the connector 103. The CPU 100a, the LCD 100b, the touch panel 100c, the microcontroller 100d, the main storage unit 100f, the auxiliary storage unit 100g and the connector 103 are interconnected via a connection bus B1. The MR sensor 100e and the microcontroller 100d are interconnected via a connection bus B2.

In the smartphone 100, the CPU 100a deploys programs stored in the auxiliary storage unit 100g onto a work area of the main storage unit 100f, and controls peripheral devices by running the programs. The smartphone 100 is thereby enabled to execute processes conforming to predetermined purposes. The main storage unit 100f and the auxiliary storage unit 100g are non-transitory recording mediums that can be read by the smartphone 100 (given one example of "a computer").

The main storage unit 100f is one example of "a storage device accessed directly from the CPU 100a. The main storage unit 100f includes, e.g., a Random Access Memory (RAM) and a Read Only Memory (ROM).

The auxiliary storage unit 100g stores various categories of programs and various items of data on the recording medium in a readable/writable manner. The auxiliary storage unit 100g is also called an external storage device. The auxiliary storage unit 100g is preinstalled with an Operating System (OS), the various categories of programs, various types of tables, and other equivalent software components. The OS includes a communication interface program to transfer and receive the data to and from the external apparatuses connected via the connector 103. The external apparatus includes, e.g., the information processing apparatus instanced by the PC, and the external storage device, which are connected to the cradle 200. Note that the auxiliary storage unit 100g may also be part of, e.g., a cloud system configured as an aggregation of the computers on the network.

The auxiliary storage unit 100g is exemplified by an Erasable Programmable ROM (EPROM), a Solid State Drive (SSD), and a Hard Disk Drive (HDD). The auxiliary storage unit 100g is further exemplified by a Compact Disc (CD) drive, a Digital Versatile Disc (DVD) drive, and a Blu-ray (registered trademark) Disc (BD) drive. The auxiliary storage unit 100g may also be provided by a Network Attached Storage (NAS) or a Storage Area Network (SAN).

A non-transitory computer readable recording medium connotes a non-transitory recording medium capable of accumulating information instanced by the data, the programs and other equivalent information electrically, magnetically, optically, mechanically or by chemical action, which can be read from the smartphone 100. Among these non-transitory recording mediums, the recording mediums usable by the smartphone 100 through the cradle 200 are exemplified by a flexible disc, a magneto-optic disc, a CD-ROM, a CD-R/W, a DVD, a Blu-ray disc, a DAT, an 8 mm tape, and a memory card like a flash memory. A hard disc, the SSD or the ROM and other equivalent recording mediums are given as the non-transitory recording mediums fixed within the smartphone 100.

The data processed by the CPU 100a and the data stored on the main storage unit 100f are outputted to the liquid crystal display 100b. The liquid crystal display 100b is, e.g., the LCD. The liquid crystal display 100b may also be a Plasma Display Panel (PDP), an Electroluminescence (EL) panel, and an organic EL panel.

The touch panel 100c accepts a user's touch operation. The touch operation includes a tap of tapping on the touch panel 100c with a finger, a flick of swiftly moving the finger off the touch panel 100c, which is kept contacting the touch panel 100c, or a swipe of softly moving the finger away from the touch panel 100c, which is kept contacting the touch panel 100c. A touch detection method using the touch panel 100c may include whatever methods capable of detecting the user's touch operation. Methods applicable to the touch detection method using the touch panel 100c are exemplified by a matrix switch method, a resistive film method, a surface acoustic wave method or an electrostatic capacity method. The LCD/touch panel 101 includes the liquid crystal display 100b and the touch panel 100c.

The microcontroller 100d is a micro controller. The microcontroller 100d includes an arithmetic circuit and a storage device. The microcontroller 100d acquires voltage values of contacts 103b depicted in FIG. 5, thereby determining a connection state between the smartphone 100 and the cradle 200. The microcontroller 100d performs communications with a microcontroller 200d of the cradle 200 via the connector 103, thereby notifying information about a voltage and other equivalent values used for charging. The microcontroller 100d is one example of "an electronic component".

The MR sensor 100e is a sensor that utilizes a magnetic resistance element, of which an electric resistance varies depending on a magnetic field. The MR sensor 100e detects the magnetic field generated from a magnet provided on the cradle 200, thus detecting closeness of how much the smartphone 100 approaches the cradle 200. The MR sensor 100e is one example of "a sensor to detect closeness of another electronic apparatus". Note that the MR sensor is an exemplification of the sensor, and may adopt any detection principles of the sensors as far as being capable of detecting the closeness of another electronic apparatus.

Figure 5:
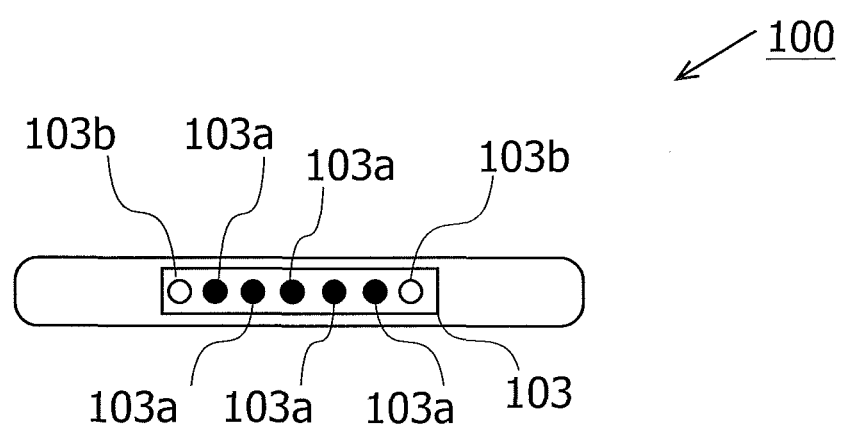
FIG. 5 is a drawing schematically illustrating a connector provided on a bottom surface (a lower surface) of the smartphone.

The connector 103 is electrically connected to the connector 203 of the cradle 200, whereby the smartphone 100 and the cradle 200 get in a communicable state with each other. FIG. 5 is a drawing schematically illustrating the connector 103 provided on a bottom surface (the lower surface) of the smartphone 100. FIG. 5 is also a planar view of the lower surface of the smartphone 100. The connector 103, which is formed with a flat surface, is equipped with a plurality of contacts 103a and a plurality of contacts 103b corresponding to a plurality of terminals (contacts) 203a and 203b (see FIG. 7) equipped in the connector 203. In FIG. 5, the contacts 103a are schematically depicted by solid black circles, while the contacts 103b are schematically depicted by solid white circles. The contacts 103a and 103b are linearly aligned, and the contacts 103b are disposed on both sides of the plurality of contacts 103a. The contacts 103b detect the connection states or are used for detecting the connection states between the smartphone 100 and the cradle 200. The contacts 103a are used for performing the communications (for transmitting and receiving the data) between the smartphone 100 and the cradle 200, and for supplying the electric power to the smartphone 100 from the cradle 200, and vice versa. In other words, the connectors 103a are used as the contacts for supplying the electric power and for performing the data communications. Note that a water-stop treatment is applied to between the connector 103 and a housing of the smartphone 100, thereby preventing water from permeating an interior of the housing from a periphery of the connector 103.

Each of the contacts 103b is connected to the microcontroller 100d illustrated in FIG. 4, and the microcontroller 100d acquires a voltage given upon reaching the contact state between the contact 103b and the contact 203b of the cradle 200. The voltages applied to the contacts 103b are adjusted to fall within fixed ranges different from each other, depending on a case in which the electric power is supplied to the microcontroller 200d mounted on the cradle 200 and a case in which the electric power is not supplied to the microcontroller 200d. The contact 103b is one example of "a contact with conductivity varying corresponding to a contact state with another electronic apparatus". The contact 103a is one example of "a second contact".

Figure 6:
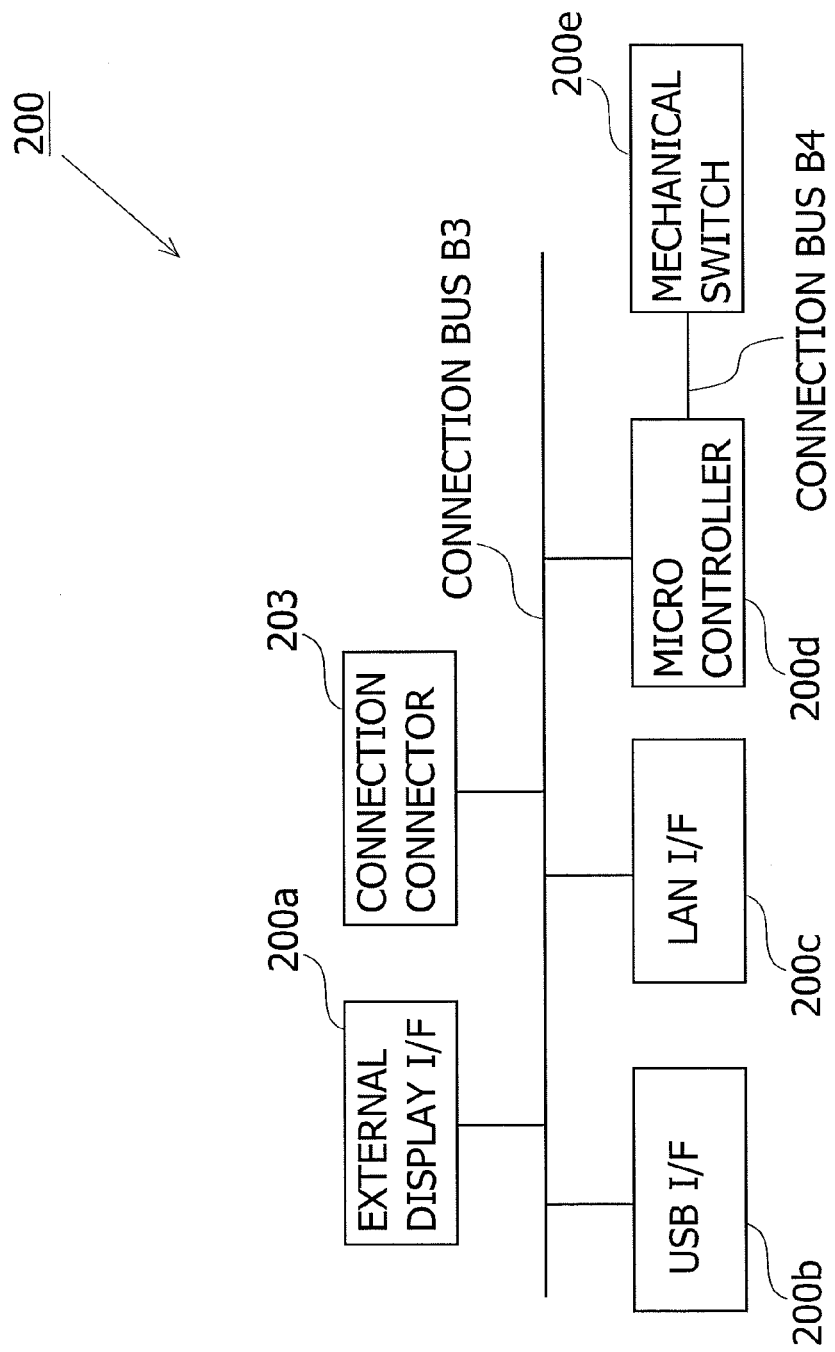
FIG. 6 is a diagram illustrating one example of a hardware configuration of the cradle.

FIG. 6 is a diagram illustrating one example of a hardware configuration of the cradle 200. The cradle 200 includes an external display Interface (I/F) 200a, a connector 203, a Universal Serial Bus Interface (USB I/F) 200b, a Local Area Network Interface (LAN I/F) 200c, the microcontroller 200d, and the mechanical switch (SW) 200e. The external display I/F 200a, the connector 203, the USB I/F 200b, the LAN I/F 200c and the microcontroller 200d are interconnected via a connection bus B3. The mechanical switch 200e and the microcontroller 200d are interconnected via a connection bus B4.

The external display I/F 200a, the USB I/F 200b and the LAN I/F 200c are interfaces with the external apparatuses. The external apparatuses connected to the external display I/F 200a, the USB I/F 200b and the LAN I/F 200c, can be used from the smartphone 100 connected to the cradle 200.

Figure 7:
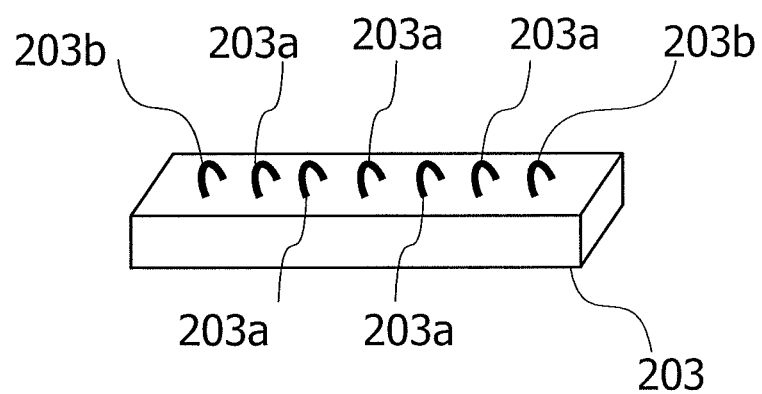
FIG. 7 is a drawing illustrating one example of a connector of the cradle.

The connector 203 is connected to the connector 103 of the smartphone 100 to thereby establish the electric connection between the smartphone 100 and the cradle 200, thus enabling the communications between both these apparatuses and the supply/reception of the electric power therebetween. FIG. 7 is a drawing illustrating one example of the connector 203 of the cradle 200. The connector 203 includes a plurality of terminals (contacts) 203a and a plurality of terminals (contacts) 203b corresponding to the contacts 103a and the contacts 103b of the connector 103. The contact 203a and the contact 203b are contacts that are, e.g., spring contacts utilizing an elastic force. The contact 203a and the contact 203b are configured to be advanceable/retractable in up-and-down directions. The contact 203a and the contact 203b get retractable (sinkable) downward by being pressed upon reaching the contact state with the connector 103. By contrast, upon being disconnected from the connector 103, the contact 203a and the contact 203b get advanceable upward by biasing forces (resilient forces) of the springs. The respective contacts 203a and the contacts 203b are brought into the contact state with the contacts 103a and the contacts 103b of the connector 103, whereby the smartphone 100 and the cradle 200 are electrically connected to each other. The contacts 203a are used for performing the data communications and supplying/receiving the electric power through the contact state with the contacts 103a. In other words, the contacts 103a are used as the contacts for supplying the power source and the contacts for performing the data communications. The contacts 203a and the contacts 203b are linearly aligned, and the contacts 203b are disposed on both sides of the plurality of contacts 203a. The contacts 203b are connected to the microcontroller 200d. The voltages applied to the contacts 203b are adjusted to fall within fixed ranges different from each other, depending on a case in which the electric power is supplied to the microcontroller 100d mounted on the smartphone 100 and a case in which the electric power is not supplied to the smartphone 100d. Note that the contact 203a and the contact 203b each taking substantially an inverted U-shape are illustrated in the example of FIG. 7, and an upper end of each of the contacts 203a, 203b may, however, take a rectilinear (bar-like) shape and may also take other shapes. The contact 203b is one example of "a contact the conductivity varying corresponding to a contact state with another electronic apparatus". The contact 203a is one example of "a second contact". The contact 203b is one example of "a contact".

The cradle 200 may further include an unillustrated battery. The cradle 200 includes the battery and is thereby enabled to supply the electric power to the smartphone 100 even when not connected to the AC power source. The smartphone 100 connected to the AC power source can also charge the battery, equipped in the cradle 200, with the electricity. It is a matter of course that the smartphone 100 has the battery (unillustrated).

The microcontroller 200d is a microcontroller. The microcontroller 200d includes an arithmetic circuit and a storage device. The microcontroller 200d acquires the voltages applied to the contacts 203b, thereby determining the connection state between the smartphone 100 and the cradle 200. The microcontroller 200d performs the communications with the microcontroller 100d of the smartphone 100 via the connector 203, thereby acquiring the items of information such as the voltage of the power source to be supplied to the smartphone 100. The microcontroller 200d is one example of "the electronic component".

The mechanical switch 200e is a mechanical switch. The mechanical switch 200e has an unillustrated electrical contact, and the electrical contact gets in an ON-state upon being pressed by the smartphone 100 placed on the cradle 200, thus detecting the closeness between the smartphone 100 and the cradle 200. The mechanical switch 200e is one example of "a sensor to detect closeness of another electronic apparatus". Note that the mechanical switch is an exemplification of the sensor, and may adopt any detection principles of the sensors as far as being capable of detecting the closeness of another electronic apparatus.

Figure 8:
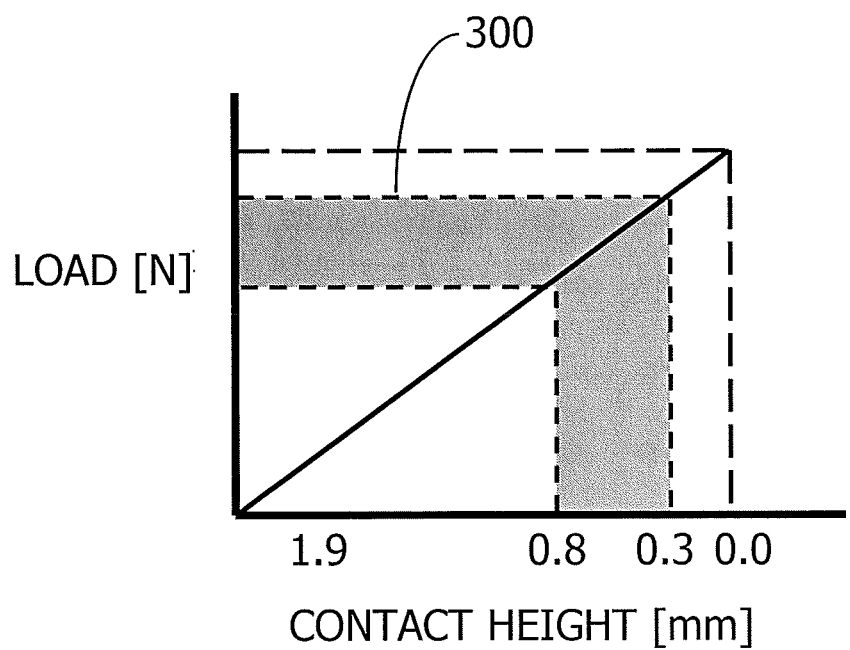
FIG. 8 is a diagram illustrating one example of a relationship between a height of a spring contact and a load applied to the contact.

FIG. 8 is a diagram illustrating one example of a relationship between a height of the spring contact and a load applied to the spring contact. In FIG. 8, the spring contact includes the contact 203a and the contact 203b of the cradle 200. The axis of ordinate in FIG. 8 indicates the load applied to the spring contact. A unit of the load is newton (N). The axis of abscissa indicates the height of the spring contact. A unit of the height of the spring contact is millimeter (mm). The height of the spring contact varies by a pressing force of the smartphone 100 (the connector 103) on the spring contact, whereby an impedance of the spring contact varies. When the height (load) of the spring contact is within a predetermined range, the impedance falls within a range indicating a preferable connecting state between the smartphone 100 and the cradle 200. A hatching area 300 in FIG. 8 represents a range in which the connection between the smartphone 100 and the cradle 200 is determined to be preferable. In the example of FIG. 8, when the height of the spring contact is within a range of 0.8 mm-0.3 mm, the electrical connection between the smartphone 100 and the cradle 200 is determined preferable. The impedance is one example of "the conductivity of the contact".

Figure 9A:
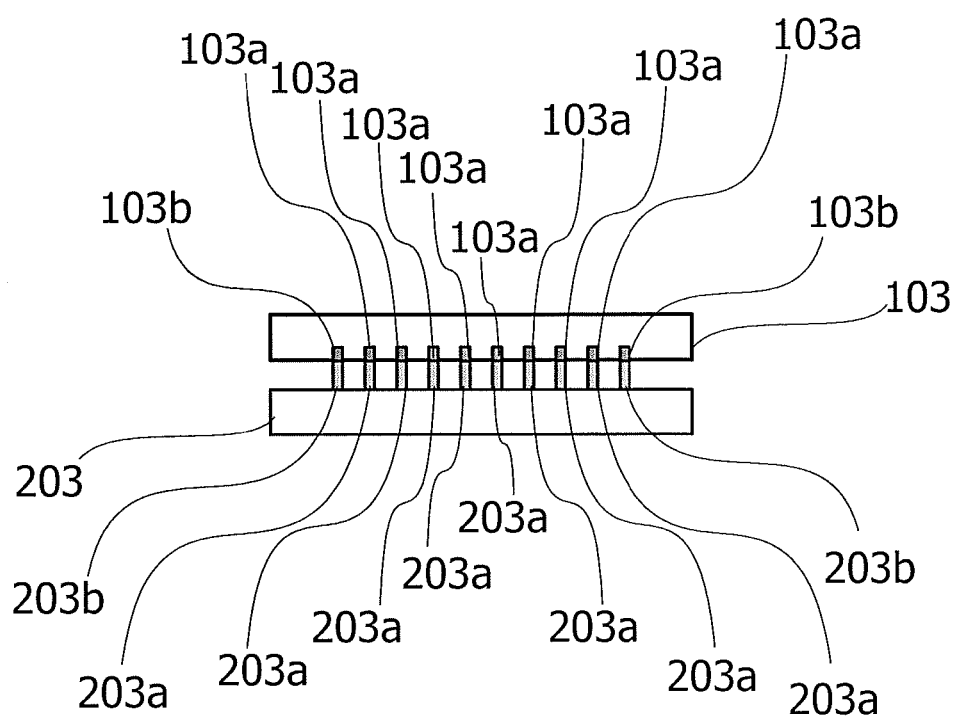
FIG. 9A is an enlarge drawing illustrating one example of a connecting portion between the smartphone and the cradle.

FIGS. 9A and 9B are enlarged drawings each illustrating one example of a connecting portion between the smartphone 100 and the cradle 200. Each of FIGS. 9A and 9B illustrates the connector 103 of the smartphone 100 and the connector 203 of the cradle 200 in the normally connected state between the smartphone 100 and the cradle 200 as depicted in FIG. 3. In FIG. 9A, the smartphone 100 (the connector 103) and the cradle 200 (the connector 203) are substantially in parallel with each other, and equal loads are applied to the contacts 203a and 203b of the cradle 200. Therefore, in the case of FIG. 9A, the contacts 203a and 203b of the connector 203 get in the state of receiving the equal loads from the connector 103 and being uniformly sunk and thus brought into the contact state with the corresponding contacts 103a and 103b. In FIG. 9B, the smartphone 100 (the connector 103) is inclined and connected to the cradle 200 in this inclined state. Hence, as indicated by an encircled area in FIG. 9B, there is produced a weak contact area between the contacts of the connector 103 and the contacts of the connector 203. In such an area, the impedance probably rises due to the insufficient contact state between these contacts. Consequently, such a possibility occurs that the electric power fails to be supplied and received between the smartphone 100 and the cradle 200.

Figure 10A:
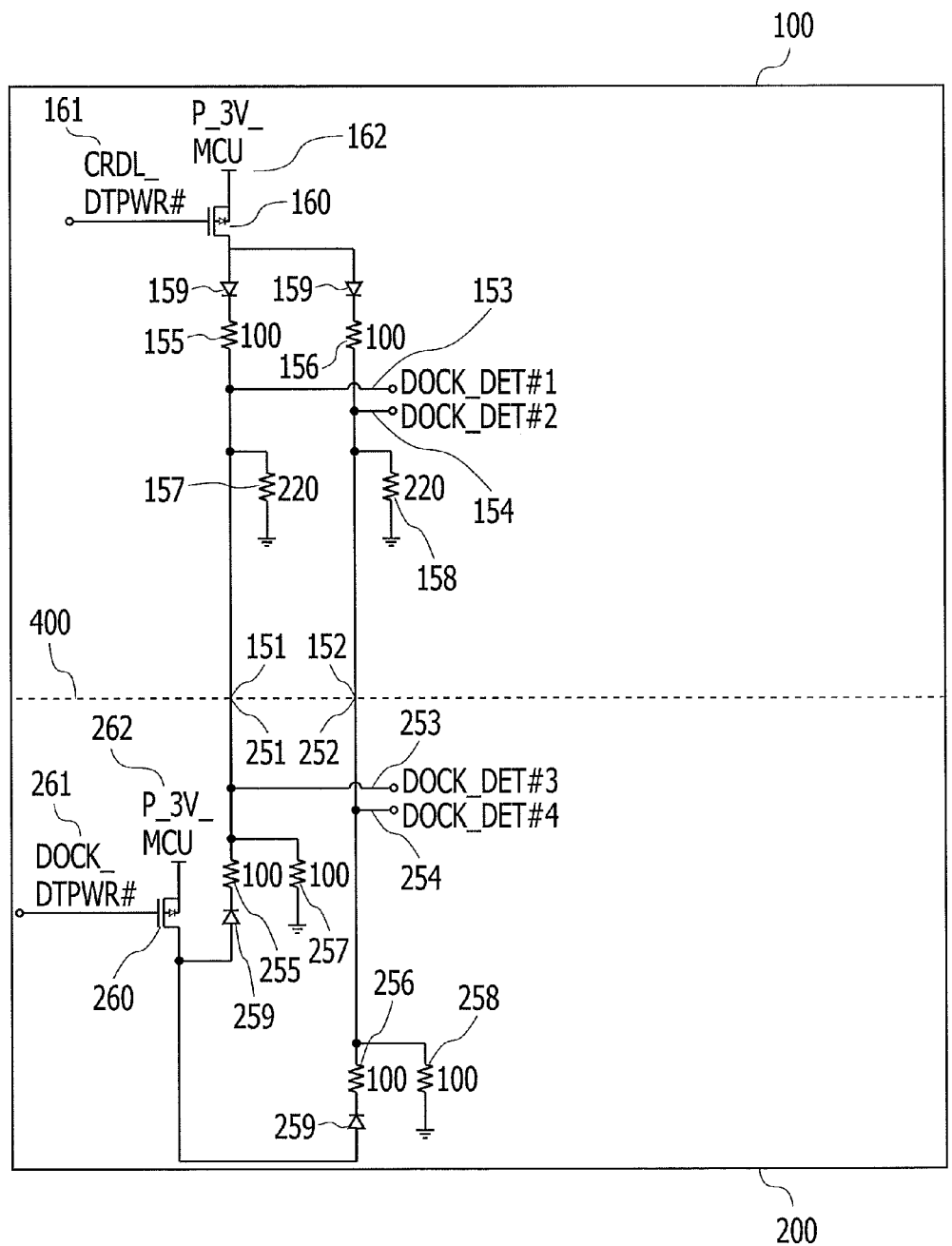
FIG. 10A is a diagram illustrating one example of a circuit to determine a connecting state of the smartphone to the cradle.

FIG. 10A is a diagram illustrating one example of a circuit to determine the connecting state of the smartphone 100 to the cradle 200. In FIG. 10A, a circuit of the smartphone 100 is illustrated on an upper side from a dotted line 400. A circuit of the cradle 200 is depicted on a lower side from the dotted line 400.

The circuit of the smartphone 100 illustrated in FIG. 10A includes a contact 151, a contact 152, a terminal 153, a terminal 154, a resistance 155, a resistance 156, a resistance 157, a resistance 158, a plurality of diodes 159, and a switch 160. The circuit of the cradle 200 illustrated in FIG. 10A includes a contact 251, a contact 252, a terminal 253, a terminal 254, a resistance 255, a resistance 256, a resistance 257, a resistance 258, a plurality of diodes 259, and a switch 260.

The contact 151 and the contact 152 correspond to the contacts 103b, 103b. The contact 251 and the contact 252 correspond to the contacts 203b, 203b. To be specific, in FIG. 10A, the contact 103b of the smartphone 100 gets into the contact state with the contact 203b of the cradle 200 in a position of the dotted line 400.

In FIG. 10A, a voltage value acquired with respect to the contact 151 of the smartphone 100 is defined as DOCK_DET#1, and a voltage value acquired with respect to the contact 152 is defined as DOCK_DET#2. A voltage value acquired with respect to the contact 251 of the cradle 200 is defined as DOCK_DET#3, and a voltage value acquired with respect to the contact 252 is defined as DOCK_DET#4. The terminal 153 and the terminal 154 are connected to the microcontroller 100d of the smartphone 100. The microcontroller 100d acquires the voltage values DOCK_DET#1 and DOCK_DET#2 via the terminal 153 and the terminal 154. The terminal 253 and the terminal 254 are connected to the microcontroller 200d of the cradle 200. The microcontroller 200d acquires the voltage values DOCK_DET#3 and DOCK_DET#4 via the terminal 253 and the terminal 254. The voltage values DOCK_DET#1, DOCK_DET#2, DOCK_DET#3 and DOCK_DET#4 are one examples of "a value indicating the conductivity". The microcontroller 100d connected to the terminal 153 and the terminal 154 is one example of "a processor receiving an input of a value indicating conductivity of a contact with the conductivity varying corresponding to a contact state with another electronic apparatus". The microcontroller 200d connected to the terminal 253 and the terminal 254 is one example of "a processor receiving an input of a value indicating conductivity of a contact with the conductivity varying corresponding to a contact state with another electronic apparatus".

The voltage value, i.e., DOCK_DET#1 acquired with respect to the contact 151 is adjusted to become a value that differs in three patterns 1-1 to 1-3 given below due to a resistance division into, e.g., the resistance 155 of 100Ω through the resistance 157 of 220Ω.

Pattern 1-1: A case in which the smartphone 100 and the cradle 200 are not connected together.

Pattern 1-2: A case in which the smartphone 100 and the cradle 200 are connected, but the microcontroller 200d of the cradle 200 is not supplied with the electric power.

Pattern 1-3: A case in which the smartphone 100 and the cradle 200 are connected, and the microcontroller 200d of the cradle 200 is supplied with the electric power.

The voltage value, i.e., DOCK_DET#2 acquired with respect to the contact 152 is adjusted to become a value that differs in the foregoing three patterns 1-1 to 1-3 given below due to the resistance division into, e.g., the resistance 156 of 100Ω through the resistance 158 of 220Ω.

The voltage value, i.e., DOCK_DET#3 acquired with respect to the contact 251 of the cradle 200 is adjusted to become a value that differs in three patterns 2-1 to 2-3 given below due to the resistance division into, e.g., the resistance 255 of 100Ω through the resistance 257 of 100Ω.

Pattern 2-1: A case in which the smartphone 100 and the cradle 200 are not connected together.

Pattern 2-2: A case in which the smartphone 100 and the cradle 200 are connected, but the microcontroller 100d of the smartphone 100 is not supplied with the electric power.

Pattern 2-3: A case in which the smartphone 100 and the cradle 200 are connected, and the microcontroller 100d of the smartphone 100 is supplied with the electric power.

The voltage value, i.e., DOCK_DET#4 acquired with respect to the contact 252 is adjusted to become a value that differs in the foregoing three patterns 2-1 to 2-3 given below due to the resistance division into, e.g., the resistance 256 of 100Ω through the resistance 258 of 100Ω.

A CRDL_DTPWR# signal 161 of the smartphone 100 is a signal for turning ON/OFF the switch 160, corresponding to an event that the MR sensor 100e detects the closeness between the smartphone 100 and the cradle 200. When the MR sensor 100e does not detect the cradle 200, the signal 161 takes a signal level "High". Whereas when the MR sensor 100e detects the closeness between the smartphone 100 and the cradle 200, the CRDL_DTPWR# signal 161 takes a signal level "Low". This control is done by the microcontroller 100d. When the signal level of the CRDL_DTPWR# signal 161 is set "Low", the switch 160 turns ON. When the switch 160 turns ON, the diode 159 is supplied with the electric power from a pull-up power source (P_3V_MCU) 162. The circuit of the smartphone 100 illustrated in FIG. 10A is provided with the plurality of diodes 159 that rectify an electric current flowing across the circuit. The microcontroller 100d measures an output voltage (DOCK_DET#1, DOCK_DET#2) given from each of the terminals 153 and 154.

A DOCK_DTPWR signal 261 of the cradle 200 is a signal for turning ON/OFF the switch 260, corresponding to an event that the mechanical switch 200e detects the closeness between the smartphone 100 and the cradle 200. When the mechanical switch 200e does not detect the closeness between the smartphone 100 and the cradle 200, the DOCK_DTPWR signal 261 takes the signal level "High". Whereas when the mechanical switch 200e detects the closeness between the smartphone 100 and the cradle 200, the DOCK_DTPWR signal 261 takes the signal level "Low". This control is done by the microcontroller 200d. When the signal level of the DOCK_DTPWR signal 261 is set "Low", the switch 260 turns ON. When the switch 260 turns ON, the electric power is supplied from a pull-up power source (P_3V_MCU) 262 to the diode 259. The circuit of the cradle 200 illustrated in FIG. 10A is provided with the plurality of diodes 259 that rectify the electric current flowing across the circuit. The microcontroller 200d measures an output voltage (DOCK_DET#3, DOCK_DET#4) given from each of the terminals 253 and 254.

FIG. 10B is a diagram illustrating one example of a range of the voltage values, acquired from the terminal 153 and the terminal 154, from which to determine the normal connection. A resistance value of the circuit depicted in FIG. 10A is set so that the voltage values detected in the patterns 1-1, 1-2, 1-3 fall within the range in the table illustrated in FIG. 10B. The same is applied to FIG. 10C that will be illustrated later on. In the example depicted in FIG. 10B, the normal voltages are within a range of ±5% of a set value. A way of taking the range can be, however, properly set. In FIG. 10B, a row "not yet connected" exemplifies a range of the voltage values determined to be normal when the smartphone 100 is not connected to the cradle 200. Values "1.37V-1.52V" are exemplified as the range of the voltage values in the row "not yet connected". The row "not yet connected" corresponds to the pattern 1-1 described above. In FIG. 10B, a row "dock connected cradle's microcontroller OFF" indicates a range of the voltage values determined to be normal when the smartphone 100 is connected to the cradle 200 and when the power source is not supplied to the microcontroller 200d of the cradle 200. In FIG. 10B, the row "dock connected cradle's microcontroller OFF" exemplifies a range of 0.81V-0.90V as the range of the voltage values. The row "dock connected cradle's microcontroller OFF" in FIG. 10B corresponds to the pattern 1-2 described above. In FIG. 10B, a row "dock connected cradle's microcontroller ON" indicates the voltage values determined to be normal when the smartphone 100 is connected to the cradle 200 and when the power source is supplied to the microcontroller 200d of the cradle 200. In FIG. 10B, the row "dock connected cradle's microcontroller ON" exemplifies a range of 1.15V-1.28V as the range of the voltage values. In FIG. 10B, the row "dock connected cradle's microcontroller ON" corresponds to the pattern 1-3 described above. In the present specification, the range of the voltage values exemplified in the row "dock connected cradle's microcontroller OFF" in FIG. 10B will hereinafter be referred to as a detection voltage 2 range, and the range of the voltage values exemplified in the row "dock connected cradle's microcontroller ON" in FIG. 10B will hereinafter be referred to as a detection voltage 1 range. The voltage values of the detection voltage 1 range and the detection voltage 2 range are determined by tests and other equivalent practical activities when designing a product. Information of the voltage values of the detection voltage 1 range and the detection voltage 2 range is stored on, e.g., a storage device of the microcontroller 100d. The detection voltage 1 range and the detection voltage 2 range are one example of "a predetermined reference".

FIG. 10C is a diagram illustrating one example of a range of the voltage values, acquired from the terminal 253 and the terminal 254, from which to determine the normal connection. In FIG. 10C, values "0.99V-1.11V" are exemplified as the range of the normal voltage values in the row "not yet connected". The row "not yet connected" in FIG. 10C corresponds to the pattern 2-1 described above. In FIG. 10C, a row "dock connected body microcontroller OFF" indicates the voltage values determined to be normal when the smartphone 100 is connected to the cradle 200 and when the power source is not supplied to the microcontroller 100d of the smartphone 100. In FIG. 10C, the row "dock connected body microcontroller OFF" exemplifies a range of 0.81V-0.90V as the range of the voltage values. The row "dock connected body microcontroller OFF" in FIG. 10C corresponds to the pattern 2-2 described above. In FIG. 10C, a row "dock connected body microcontroller ON" indicates the voltage values determined to be normal when the smartphone 100 is connected to the cradle 200 and when the power source is supplied to the microcontroller 100d of the smartphone 100. In FIG. 10C, the row "dock connected body microcontroller ON" exemplifies a range of 1.15V-1.28V as the range of the voltage values. In FIG. 10C, the row "dock connected body microcontroller ON" corresponds to the pattern 2-3 described above. In the present specification, the range of the voltage values exemplified in the row "dock connected body microcontroller OFF" in FIG. 10C will hereinafter be referred to as a detection voltage 4 range, and the range of the voltage values exemplified in the row "dock connected body microcontroller ON" in FIG. 10C will hereinafter be referred to as a detection voltage 3 range. The voltage values of the detection voltage 3 range and the detection voltage 4 range are determined by the tests and other equivalent practical activities when designing the product. Information of the voltage values of the detection voltage 3 range and the detection voltage 4 range is stored on, e.g., a storage device of the microcontroller 200d. The detection voltage 3 range and the detection voltage 4 range are one example of "the predetermined reference".

Figure 11A:
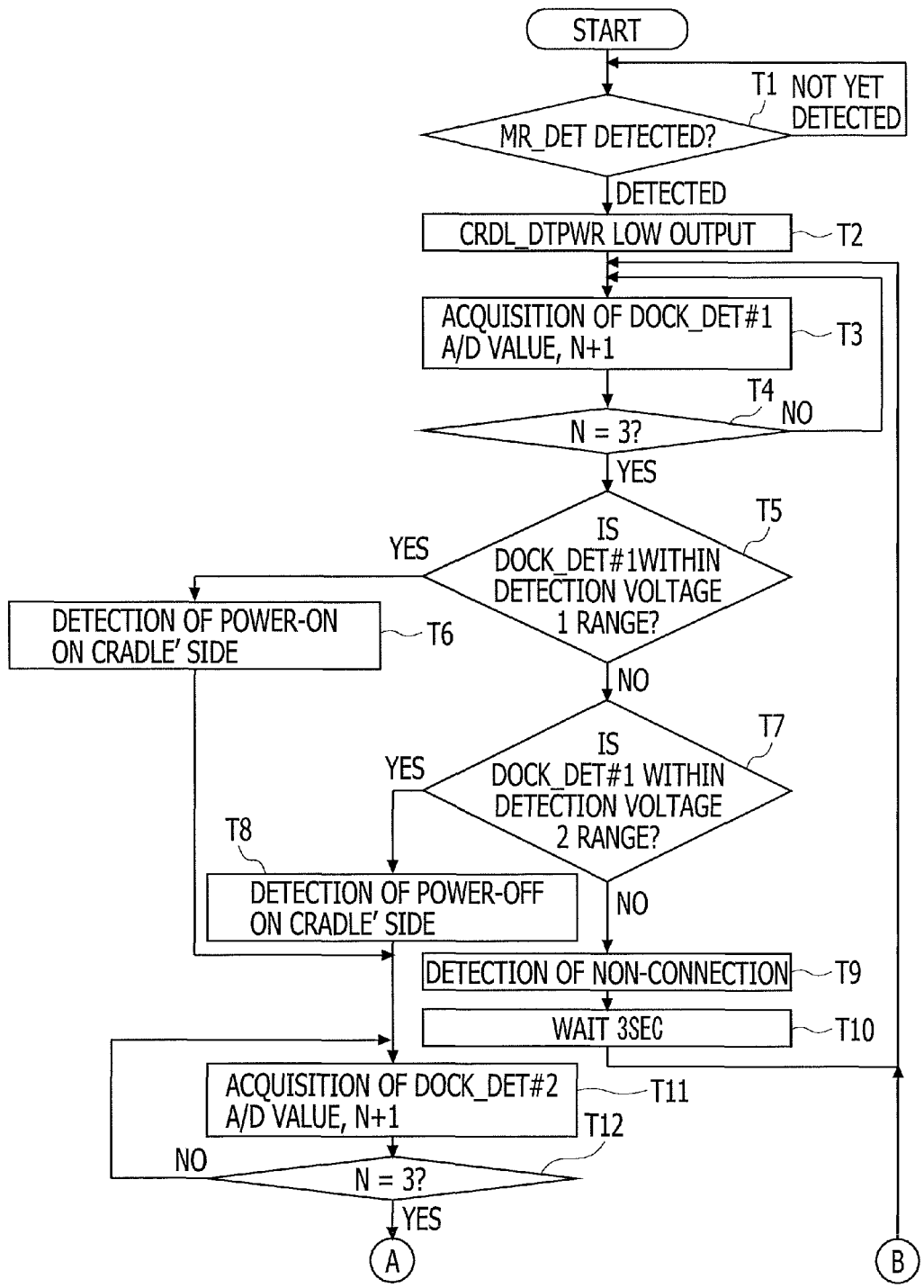
FIGS. 11A-11B are flowcharts illustrating one example of a processing flow of the smartphone to the cradle.
Figure 11B:
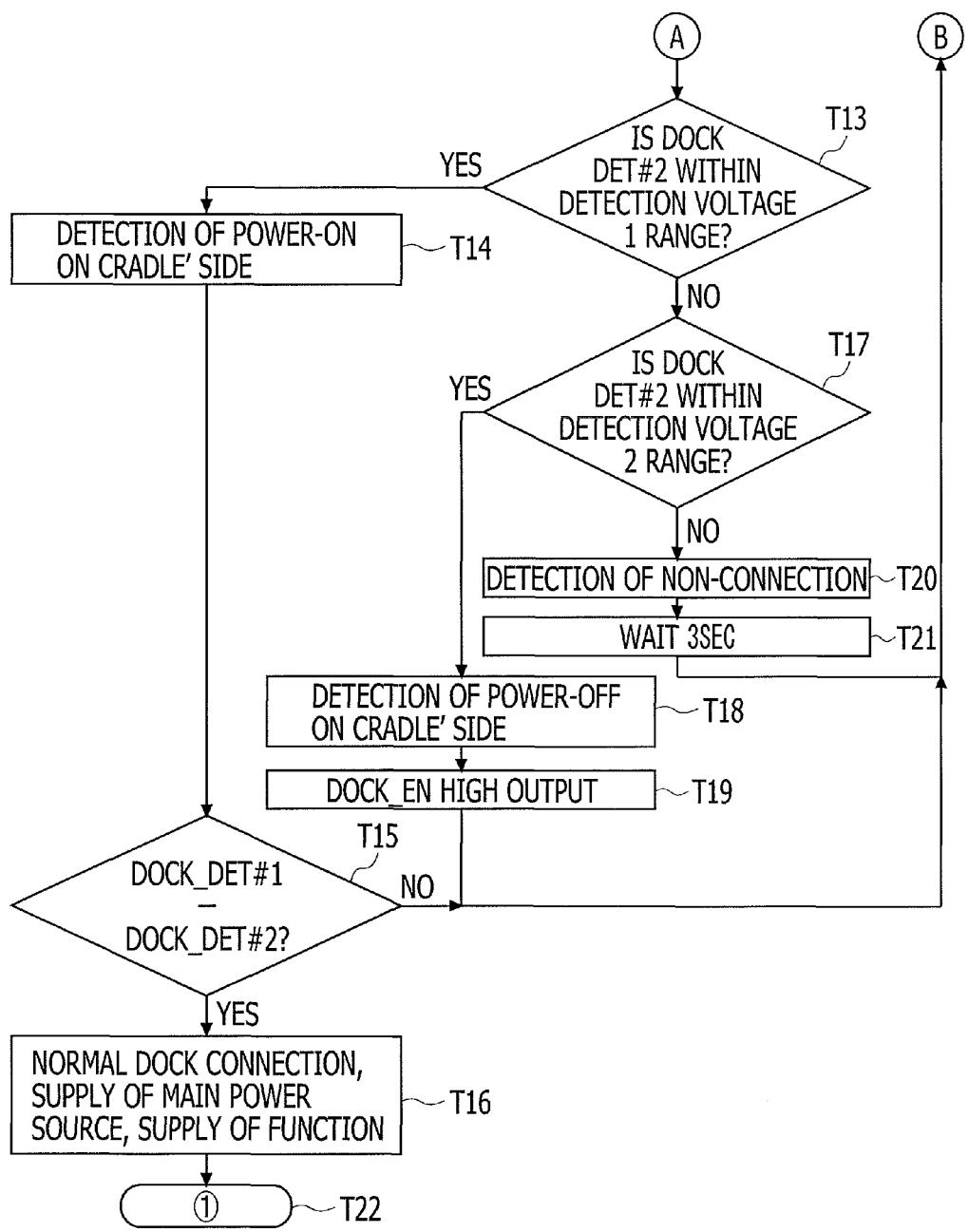

FIGS. 11A-11B are flowcharts illustrating one example of a processing flow of the smartphone, for determining a connection state of the smartphone 100 to the cradle 200. In FIGS. 11A-11B, similarly to FIG. 10A, a voltage value of the voltage acquired at one contact 103b is notated by DOCK_DET#1, while a voltage value of the voltage acquired at the other contact 103b is notated by DOCK_DET#2. The processing flow of the smartphone 100, for detecting the connection to the cradle 200, will hereinafter be described with reference to FIGS. 11A-11B. For example, the microcontroller 100d executes processes illustrated in FIGS. 11A-11B.

In T1, the MR sensor 100e detects the closeness between the smartphone 100 and the cradle 200. Upon detecting the closeness, the processing flow from T2 onward is initiated.

In T2, a pull-up power source (P_3V_MCU) 162 of the contact 103b is validated. To be specific, when the MR sensor 100e detects the closeness between the smartphone 100 and the cradle 200, the microcontroller 100d sets LOW the signal level of the CRDL_DTPWR# signal 161 in FIG. 10. The switch 160 in FIG. 10 is turns ON by setting LOW the signal level of the CRDL_DTPWR# signal 161. The circuit is supplied with the electric power from the pull-up power source (P_3V_MCU) 162 by turning ON the switch 160.

In T3, DOCK_DET#1, i.e., the voltage value related to one contact 103b is acquired (measured) by the microcontroller 100d. The microcontroller 100d performs Analog/Digital (A/D) conversion of the acquired voltage value DOCK_DET#1 into a digital signal. The microcontroller 100d acquires the voltage value converted into the digital signal as DOCK_DET#1. The thus-acquired voltage value DOCK_DET#1 is stored on, e.g., the storage device of the microcontroller 100d. Further in T3, a value of a variable N used as a loop counter is incremented. Note that an initial value of the variable N is, e.g., "0". The microcontroller 100d executing the process in T3 is one example of "a processor acquiring a value indicating the conductivity of the first contact when bringing the first contact into a contact state with another electronic apparatus".

In T4, it is checked whether the value of the variable N is "3". When the N's value is "3", the processing advances to T5. Whereas when the N's value is not "3", the processing loops back to T3. Note that a loop from T3 to T4 is conducted to avoid mis-detecting DOCK_DET#1 by the microcontroller 100d for an accidental reason instanced by noises.

In T5, the microcontroller 100d determines whether the voltage value DOCK_DET#1 acquired in T3 is within the detection voltage 1 range. When DOCK_DET#1 is within the detection voltage 1 range (Yes in T5), the processing diverts to T6. Whereas when DOCK_DET#1 is beyond the detection voltage 1 range (No in T5), the processing advances to T7.

In T6, the microcontroller 100d determines that the cradle 200 is in a power-on state because of DOCK_DET#1 being within the detection voltage 1 range. Thereafter, the processing advances to T11.

In T7, the microcontroller 100d determines whether DOCK_DET#1 acquired in T3 is within the detection voltage 2 range. When DOCK_DET#1 is within the detection voltage 2 range (Yes in T7), the processing diverts to T8. Whereas when DOCK_DET#1 is beyond the detection voltage 2 range (No in T7), the processing advances to T9. The microcontroller 100d executing the processes in T5 and T7 is one example of "a processor determining, based on the acquired value indicating the conductivity and a predetermined reference value, whether a connection between the electronic apparatus and another electronic apparatus is sufficient".

In T8, the microcontroller 100d determines that the cradle 200 is in a power-off state because of DOCK_DET#1 being beyond the detection voltage 1 range but within the detection voltage 2 range. Thereafter, the processing advances to S11.

In T9, the microcontroller 100d determines that the smartphone 100 and the cradle 200 are not connected together because of DOCK_DET#1 being beyond both of the detection voltage 1 range and the detection voltage 2 range. In T10, the processing loops back to T3 after 3 sec as waiting time for processing.

The processes in T11-14, T17, T18, T20 and T21 are substantially the same as T3-T6, T7, T8, T9 and T10 except that the determination target voltage value changes to DOCK_DET#2 from DOCK_DET#1. Therefore, the repetitive explanations are omitted.

In T15, the voltage value DOCK_DET#1 acquired in T3 is compared with the voltage value DOCK_DET#2 acquired in T11. When DOCK_DET#1 is equal to DOCK_DET#2 (Yes in T15), the processing advances to T16. Whereas when DOCK_DET#1 is different from DOCK_DET#2 (No in T15), the processing loops back to T3. When DOCK_DET#1 is equal to DOCK_DET#2, it is determined that the smartphone 100 and the cradle 200 are electrically connected together. Further when DOCK_DET#1 is equal to DOCK_DET#2, the cradle 200 is determined to be in the power-on state in both of T6 and T14. The microcontroller 100d executing the process in T15 is one example of "the determination unit". In the case of No in T15, the microcontroller 100d, which loops the processing back to T3, is one example of "the processor determining that an electrical connection between the electronic apparatus and another electronic apparatus is not sufficient".

At a stage of T16, it is confirmed from the process in T15 that both of the smartphone 100 and the cradle 200 are in the power-on state. Hence, in T16, e.g., the smartphone 100 connected to the AC power source charges the battery built in the cradle 200 with the electricity. Thereafter, in T22, the processing shifts from T22 to processes illustrated in FIG. 12.

At a stage of T19, it is detected from the process in T18 that the cradle 200 is in the power-off state. Consequently, the electric power is supplied to the cradle 200 from the smartphone 100. The electric power to be supplied herein is the electric power enabling at least the cradle 200 to execute the processing flow for determining the connection of the smartphone 100 to the cradle 200 in FIGS. 13A-13B. In other words, the smartphone 100 supplies the cradle 200 with the electric power used for operating the pull-up power source (P_3V_MCU) 262 and the mechanical switch 200e. The cradle 200 is thereby enabled to execute a below-mentioned processing flow illustrated in FIGS. 13A-13B by the electric power supplied in T19 even when the cradle 200 is in the power-off state upon placing the smartphone 100 thereon.

The microcontroller 100d of the smartphone 100 determined, based on the processes described above in FIGS. 11A-11B, whether the smartphone 100 and the cradle 200 are electrically connected together. However, even when the smartphone 100 and the cradle 200 are electrically connected together, there is the insufficient contact state between the contacts 103a, 103b of the smartphone 100 and the contacts 203a, 203b of the cradle 200 in some cases. Further, even when once preferably connected, the smartphone 100 is pushed up by the elastic forces of the springs of, e.g., the contacts 203a or the contacts 203b, with the result that the contact state transitions to an insufficient state as the case may be. This being the case, the smartphone 100 executes processes illustrated in FIG. 12 subsequent to the processes in FIGS. 11A-11B.

Figure 12:
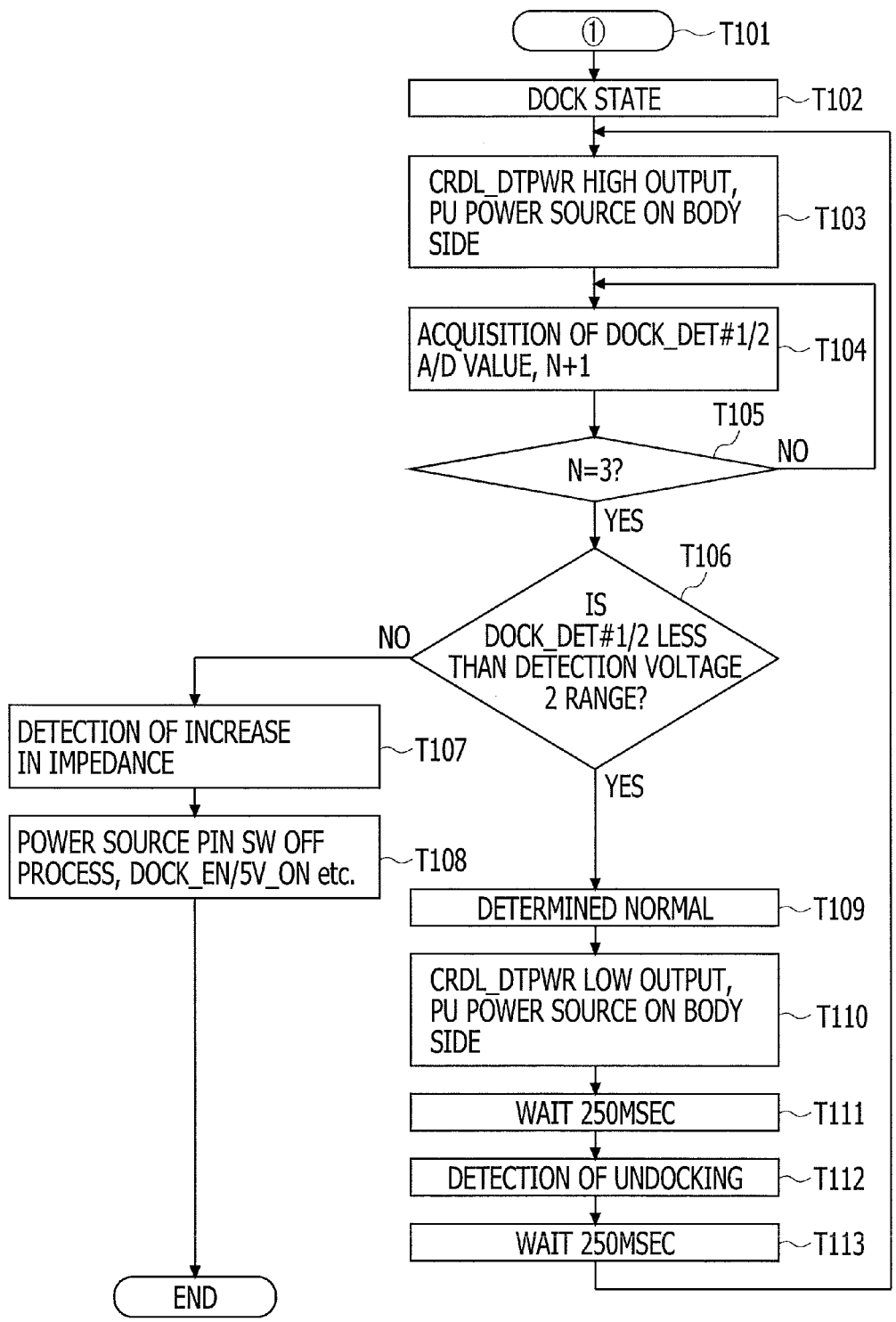
FIG. 12 is a flowchart illustrating one example of a processing flow of detecting an insufficient contact state between contacts of the smartphone and contacts of the cradle.

FIG. 12 is a flowchart illustrating one example of a processing flow for detecting the insufficient contact state between the contacts of the smartphone 100 and the contacts of the cradle 200. The insufficient contact state includes such a state that the contact state of one of the two contacts 203b is weaker than the contact state of the other contact 203b (a height of one contact 203b is larger than a height of the other contact 203b) due to obliquely inserting the smartphone 100, i.e., due to connecting the smartphone 100 obliquely to the cradle 200. A flow for detecting the insufficient connection between the smartphone 100 and the cradle 200 will hereinafter be described with reference to FIG. 12.

T101 takes over the processing from T22 in FIG. 11B. Through the processes in FIGS. 11A-11B, there occurs the DOCK state in T102, i.e., the state in which the smartphone 100 is placed on the cradle 200. In T103, the microcontroller 100d sets HIGH the signal level of the CRDL_DTPWR# signal 161 in FIG. 10A. The signal level of the CRDL_DTPWR# signal 161 is set HIGH, whereby the switch 160 turns OFF. The switch 160 turns OFF, whereby the power supply from the pull-up power source (P_3V_MCU) 162 is cut off.

In T104, the microcontroller 100d acquires the voltage values DOCK_DET#1 and DOCK_DET#2. The method of acquiring the voltage value is the same as T3 and T11 in FIG. 11A, and hence the repetitive explanation thereof is omitted. A process in T105 is the same as T4 and T12 in FIG. 11A, and therefore its repetitive explanation is omitted. The microcontroller 100d executing the process in T104 is one example of "the acquisition unit".

In T106, the microcontroller 100d determines whether DOCK_DET#1 and DOCK_DET#2 acquired in T104 are smaller than the detection voltage 2 range. When at least any one of DOCK_DET#1 and DOCK_DET#2 is smaller than the detection voltage 2 range (Yes in T106), the processing diverts to T107. When both of DOCK_DET#1 and DOCK_DET#2 are larger than the detection voltage 2 range (No in T106), the processing advances to T109. The microcontroller 100d executing the process in T106 is one example of "the determination unit".

At least any one of DOCK_DET#1 and DOCK_DET#2 acquired in T104 is smaller than the detection voltage 2 range, and hence the microcontroller 100d detects an increment of the impedance of at least one of the contacts 103b in T107. The microcontroller 100d determines from the increment of the impedance that the smartphone 100 and the cradle 200 are ill-connected. For example, a contact state between the contact 203b and the contact 103b (a first side) on the side of DOCK_DET#1 is worse than a contact state between the contact 203b and the contact 103b (a second side) on the side of DOCK_DET#2, in which case the contact resistance (impedance) between the contacts on the first side becomes larger than the contact resistance (impedance) on the second side, and the current gets hard to flow, resulting in a drop of the voltage from DOCK_DET#1. When the voltage given at this time deviates from the voltage range indicating the normal connected illustrated in FIG. 10B, the microcontroller 100d determines that the smartphone 100 and the cradle 200 are not sufficiently connected.

It is assumed, for example, that the contact 103b and the contact 203b on the side of acquiring DOCK_DET#1 are in an insufficient contact state, and the impedance thereof is 100Ω. In this case, the voltage value acquired as DOCK_DET#1 becomes approximately 0.74V in the circuit of FIG. 10A. This voltage value DOCK_DET#1 is smaller than 0.81V defined as a minimum value of the detection voltage 1 range and the detection voltage 2 range of the voltages determined to be the normal connection. Accordingly, the microcontroller 100d can determine that the contact 103b on the side of acquiring DOCK_DET#1 is in the insufficient contact state.

In T108, the microcontroller 100d restricts the function of supplying the electricity to the cradle 200 from the smartphone 100 and the function of performing the data communications between the smartphone 100 and the cradle 200. To be specific, when the electricity is supplied to the cradle 200 from the smartphone 100, the microcontroller 100d stops the supply of the electricity. The microcontroller 100d executing the process in T108 is one example of "the processor stoping electric power supply conducted via the second contact with another electronic apparatus when determining that an electrical connection between the electronic apparatus and another electronic apparatus is not sufficient".

Both of DOCK_DET#1 and DOCK_DET#2 acquired in T104 are larger than the detection voltage 2 range, and consequently the microcontroller 100d determines in T109 that the smartphone 100 and the cradle 200 are normally connected.

In T110, the microcontroller 100d sets back LOW the signal level of the CRDL_DTPWR# signal 161, which has been set HIGH in T103. The signal level of the CRDL_DTPWR# signal 161 is set back LOW, whereby the pull-up power source (P_3V_MCU) 162 turns ON. The process in T110 enables the microcontroller 100d to detect a disconnection between the smartphone 100 and the cradle 200. After 250 msec as the waiting time in T111, the microcontroller 100d determines in T112 whether the smartphone 100 is disconnected from the cradle 200. Thereafter, the processing loops back to T103 after the waiting time of 250 msec.

In the description described above, the smartphone 100 executes the processes in FIG. 12 in a way that sets HIGH the signal level of the CRDL_DTPWR# signal 161. The processes in FIG. 12 are not, however, limited to the method executed by the smartphone 100. For example, the cradle 200 may also execute the processes in FIG. 12 by setting HIGH the signal level of the DOCK_DTPWR signal 261. Moreover, both of the smartphone 100 and the cradle 200 may execute the processes in FIG. 12 by setting HIGH the signal level of the CRDL_DTPWR# signal 161 and the signal level of the DOCK_DTPWR signal 261.

Figure 13A:
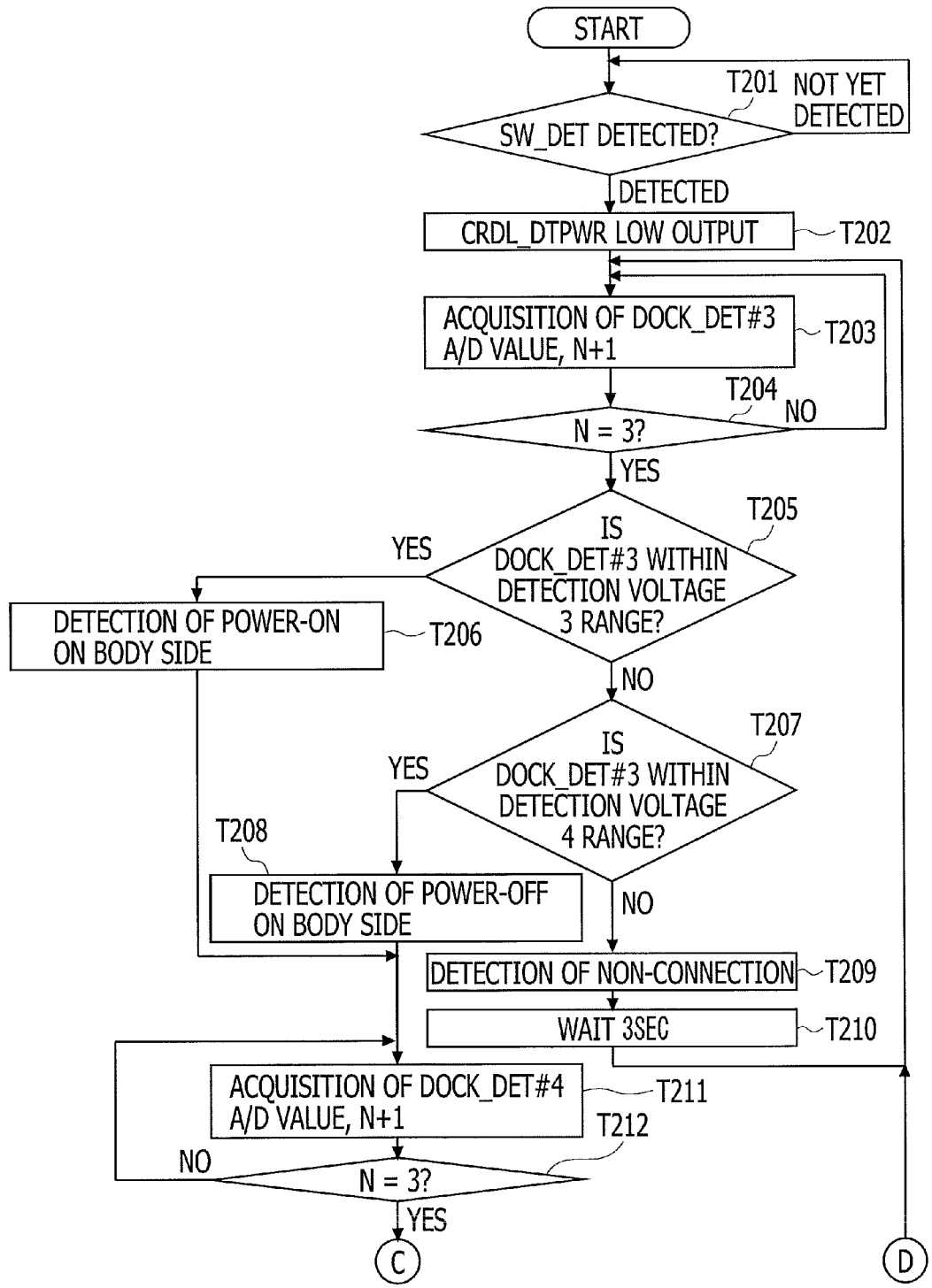
FIGS. 13A-13B are flowcharts illustrating one example of a processing flow of the cradle to determine the connecting state of the smartphone to the cradle.
Figure 13B:
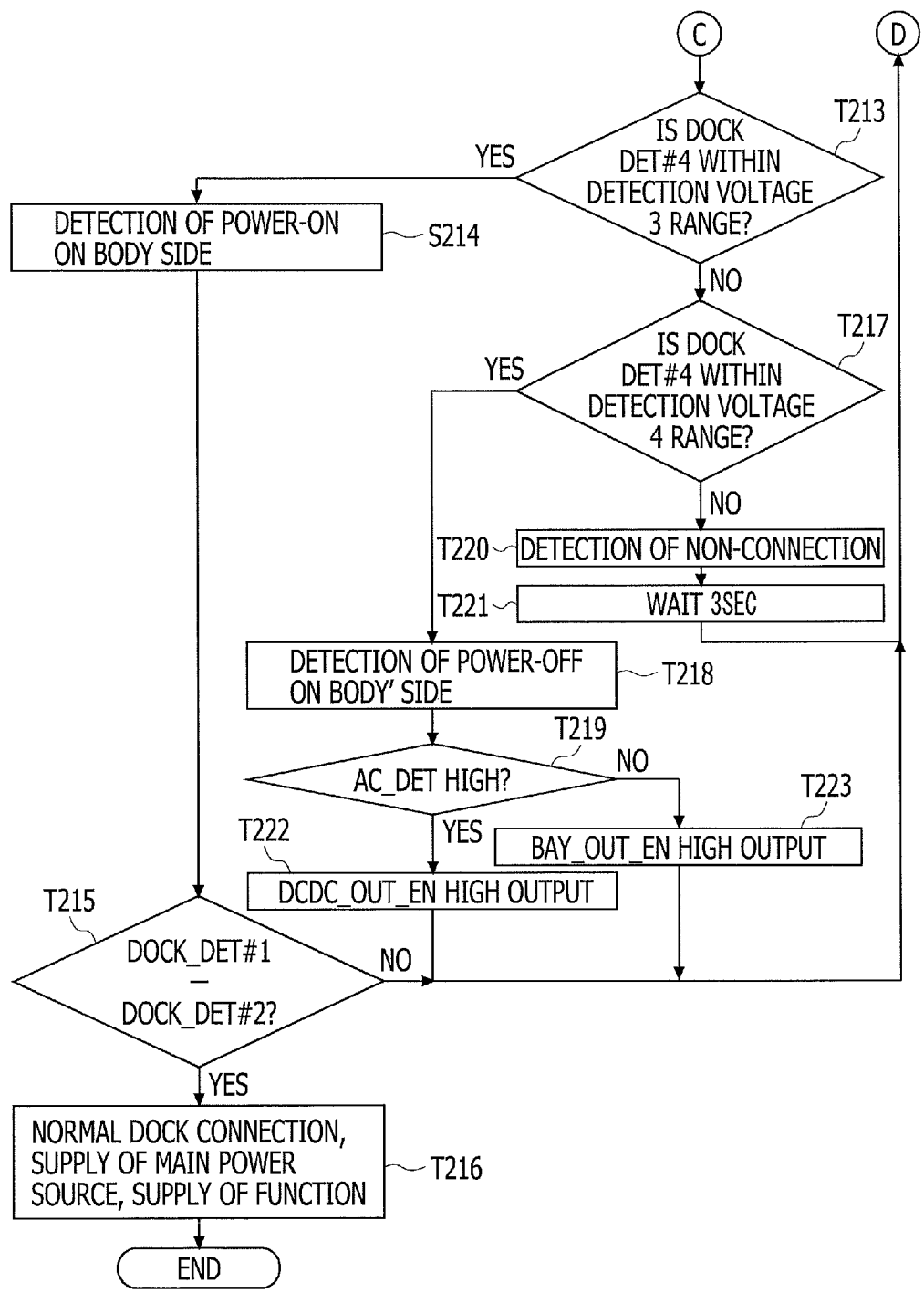

FIGS. 13A-13B are flowcharts illustrating one example of a processing flow of the cradle 200 that determines the connection state of the smartphone 100 to the cradle 200. In FIGS. 13A-13B, a voltage detected at one of one contact 203b is notated by DOCK_DET#3, while a voltage detected at the other contact 203b is notated by DOCK_DET#4. A processing flow of the cradle 200 that detects the connection of the smartphone 100 will hereinafter be described with reference to FIGS. 13A-13B.

A process in T201 of FIG. 13A is substantially the same as the process in T1 of FIG. 11A except a point that the switch used for the detection is not the MR sensor 100e but the mechanical switch 200e. The repetitive explanation thereof is therefore omitted. Processes in T202 through T221 of FIGS. 13A-13B are the same as the processes in T2 through T21 of FIGS. 11A-11B. The repetitive explanations thereof are therefore omitted.

In T219 of FIG. 13B, the microcontroller 200d determines whether the AC power source is connected to the cradle 200. When the AC power source is connected to the cradle 200 (Yes in T219), the processing advances to T222. Whereas when the AC power source is not connected to the cradle 200 (No in T219), the processing diverts to T223.

In T222, the cradle 200 supplies the electric power to the smartphone 100 from the AC power source. In T223, the cradle 200 supplies the smartphone 100 with the electric power from the built-in battery. The electric power supplied in T222 or T223 is the electric power enabling at least the smartphone 100 to execute the foregoing processing flows illustrated in FIGS. 11A-11B and 12. To be specific, the cradle 200 supplies the smartphone 100 with the electric power used for the operation of the pull-up power source (P_3V_MCU) 162 and for the operation of the MR sensor 100e. The smartphone 100 can, even when the smartphone 100 is in the power-off state, execute the processing flows illustrated in FIGS. 11 and 12 by the electric power supplied in T222 or T223. The microcontroller 200d executing the process in T222 or T223 is one example of "the control unit".

According to the embodiment, the connection state between the smartphone 100 and the cradle 200 is determined from the variation in voltage of the contact 103b or the contact 203b. As a result, according to the embodiment, it is feasible to detect the insufficient contact state between the contacts of the smartphone 100 and the contacts of the cradle 200.

According to the embodiment, when any one of the smartphone 100 and the cradle 200 is in the power-off state, the other apparatus supplies the power source to the apparatus in the power-off state. The apparatus in the power-off state is thereby enabled to execute the processing flows according to the embodiment.

In the embodiment, upon the closeness between the smartphone 100 and the cradle 200, the MR sensor 100e or the mechanical switch 200e supplies the pull-up power source (P_3V_MCU) 162 or the pull-up power source (P_3V_MCU) 262 used for the process of detecting the connection state between the smartphone 100 and the cradle 200. The smartphone 100 and the cradle 200 do not get close to each other, in which case the electric power used for the detection process is not supplied, and hence power consumptions of the smartphone 100 and the cradle 200 are restrained.

According to the embodiment, the contacts 103b and the contacts 203b are provided on both sides of the contacts 103a and on the both sides of the contacts 203a. The embodiment can therefore preferably detect the state in which the smartphone 100 is connected obliquely to the cradle 200.

According to one mode of the technology of the disclosure, it is feasible to detect the insufficient connection to another electronic apparatus.

The embodiment disclosed so far can be modified in a variety of forms. According to the embodiment, both of the smartphone 100 and the cradle 200 determine the connection state between the smartphone 100 and the cradle 200. The determination of the connection state may also be modified so that any one of the smartphone 100 and the cradle 200 implements this determination.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic apparatus to be electrically connected to a first electronic apparatus, the electronic apparatus comprising:
   a first contact with conductivity varying corresponding to a connection state with the first electronic apparatus;
   a sensor configured to detect the first electronic apparatus approximate to the sensor;
   a memory; and
   a processor coupled to the memory and the processor configured to perform:
   restricting providing electricity to the first contact while the sensor does not detect the first electronic apparatus approximate to the sensor;
   starting providing electricity to the first contact when the sensor detects the first electronic apparatus approximate to the sensor;
   acquiring a value indicating the conductivity of the first contact when providing the electricity to the first contact; and
   determining, based on the acquired value indicating the conductivity and a predetermined reference value, whether a connection between the electronic apparatus and the first electronic apparatus is sufficient,
   wherein the first contact includes a spring,
   the value indicating the conductivity is a force applied to the spring, and
   the processor determines that the connection between the electronic apparatus and the first electronic apparatus is sufficient when the force applied to the spring is larger than a predetermined load.

2. The electronic apparatus according to claim 1, further comprising a second contact to get in the contact state with the first electronic apparatus when bringing the first contact into the contact state with the first electronic apparatus, wherein the processor is further configured to perform keeping a state of restricting electric power supply via the second contact with the first electronic apparatus when determining that an electrical connection between the electronic apparatus and the first electronic apparatus is not sufficient.

3. The electronic apparatus according to claim 2, wherein the electronic apparatus has two first contacts, the first contacts and the second contacts are linearly aligned, and the first contacts are disposed on both sides of the plurality of second contacts.

4. The electronic apparatus according to claim 1, further comprising a second contact to get in the contact state with the first electronic apparatus when bringing the first contact into the contact state with the first electronic apparatus, wherein the processor is further configured to perform stoping electric power supply conducted via the second contact with the first electronic apparatus when determining that an electrical connection between the electronic apparatus and the first electronic apparatus is not sufficient.

5. The electronic apparatus according to claim 1, further comprising a second contact to get in the contact state with the first electronic apparatus when bringing the first contact into the contact state with the first electronic apparatus, wherein the processor is further configured to perform keeping a state of restricting data communications via the second contact with another the first electronic apparatus when determining that an electrical connection between the electronic apparatus and the first electronic apparatus is not sufficient.

6. The electronic apparatus according to claim 1, further comprising a second contact to get in the contact state with the first electronic apparatus when bringing the first contact into the contact state with the first electronic apparatus, wherein the processor is further configured to perform stoping data communications performed via the second contact with the first electronic apparatus when determining that an electrical connection between the electronic apparatus and the first electronic apparatus is not sufficient.

7. The electronic apparatus according to claim 1, further comprising a second contact to get in the contact state with the first electronic apparatus when bringing the first contact into the contact state with the first electronic apparatus, wherein the processor is further configured to perform starting providing electricity to the first contact in a state of restricting the flow of the electricity to the second contact when the sensor detects the first electronic apparatus approximate to the sensor.

* * * * *